Sept. 28, 1954  W. WOODS-HILL ET AL  2,690,507
ELECTRONIC MULTIPLIER
Original Filed March 3, 1950  8 Sheets-Sheet 1

Fig.1.

INVENTORS
DAVID T. DAVIS
WILLIAM WOODS-HILL
BY A. J. Etienne
ATTORNEY

INVENTORS
DAVID T. DAVIS
WILLIAM WOODS-HILL
BY
*A. J. Etienne*
ATTORNEY

Sept. 28, 1954　　　W. WOODS-HILL ET AL　　　2,690,507
ELECTRONIC MULTIPLIER

Original Filed March 3, 1950　　　　　　　　8 Sheets-Sheet 4

INVENTORS
DAVID T. DAVIS
WILLIAM WOODS-HILL
BY

*A. J. Etienne*

ATTORNEY

Fig. 8.

INVENTORS
DAVID T. DAVIS
WILLIAM WOODS-HILL
BY
ATTORNEY

Fig. 13.

Patented Sept. 28, 1954

2,690,507

UNITED STATES PATENT OFFICE 2,690,507

ELECTRONIC MULTIPLIER

William Woods-Hill, Letchworth, and David Thomas Davis, Wandsworth Common, London, England, assignors to International Business Machines Corporation, New York, N. Y., a corporation of New York Original application March 3, 1950, Serial No. 147,441. Divided and this application December 27, 1950, Serial No. 202,917

4 Claims. (Cl. 250—27)

This invention relates to electronic apparatus for multiplying utilizing the principle of halving the multiplier and doubling the multiplicand and more particularly to an electronic commutator circuit employed therein and is a division of applicants' copending application Serial No. 147,441, filed March 3, 1950.

In this method of multiplication, the multiplier (MP) is halved successively, neglecting any remainder until unity is reached. The multiplicand (MC) is successively doubled, once for each halving of the multiplier. The grand total of the MC doubled values corresponding to odd halved values of the multiplier is the required product. Thus:

| Multiplier Register | Multiplicand Register | | | Product Counter | | |
|---|---|---|---|---|---|---|
| | £ | s. | d. | £ | s. | d. |
| Decimal Number: | | | | | | |
| 99 | 9. | 18. | 2 | 9. | 18. | 2 |
| 49 | 19. | 16. | 4 | 19. | 16. | 4 |
| 24 | 39. | 12. | 8 | | | |
| 12 | 79. | 5. | 4 | | | |
| 6 | 158. | 10. | 8 | | | |
| 3 | 317. | 1. | 4 | 317. | 1. | 4 |
| 1 | 634. | 2. | 8 | 634. | 2. | 8 |
| Product | | | | 980. | 18. | 6 |

It is an object of the present invention to utilize this principle of multiplication employing purely electronic circuits including a novel electronic commutator, so that multiplication may be performed extremely rapidly.

With this apparatus employing the above enunciated principle, multiplication may be performed when one or both of the factors is expressed in a non-uniform system, such as sterling currency or hours and minutes.

The term "digit" will be used herein to denote all numbers less than the radix of the scale of notation employed. Thus, in the duo-decimal notation, 10 and 11 will be deemed to be digits. The term "gate" tube or simply gate will be used to describe a tube such as a pentode, for example, comprising more than three electrodes, the tube being so arranged that a voltage impulse applied to one electrode may be prevented from appearing at a second electrode used as an output electrode by the application of a control voltage to a third electrode. An example of such a gate is a pentode in which the voltage impulse is applied to the control grid, the anode is the output electrode and a negative control voltage may be applied to the suppressor grid.

According to the invention, a complete electronic multiplying device comprises a novel electronic commutator, an electronic multiplier (MP) register, an electronic (MC) multiplicand register, an electronic (PR) product counter, an electronic odd-even detector to determine whether the value standing in the multiplier register is even or odd, and means under control of the novel emitter for repeatedly halving the value registered in the multiplier register and doubling the value registered in the multiplicand register, and means under joint control of the multiplicand register and the odd-even detector for transferring into the product counter the value registered in the multiplicand register only when the multiplier is odd.

Throughout the specification the term "tube" will be used to refer to thermionic tubes of the high vacuum type.

The invention will be described by a specific example in which an amount in pounds, shillings and pence is multiplied by a decimal amount.

Other objects of the invention will be pointed out in the following description and claims and illustrated in the accompanying drawings, which disclose, by way of examples, the principle of the invention and the best mode, which has been contemplated, of applying that principle.

In the drawings:

Figure 13 is an explanatory chart indicating the purpose and relative timing of the various control pulses produced by the emitter during one multiplication cycle.

In order to make clear the method of operation of the complete multiplying device, the functions of the major parts will be described with particular reference to Figure 1, followed by a detailed description of the operation of the individual units. Finally, the individual steps making up a complete multiplication cycle will be detailed in the order in which they occur.

General

Figure 1:
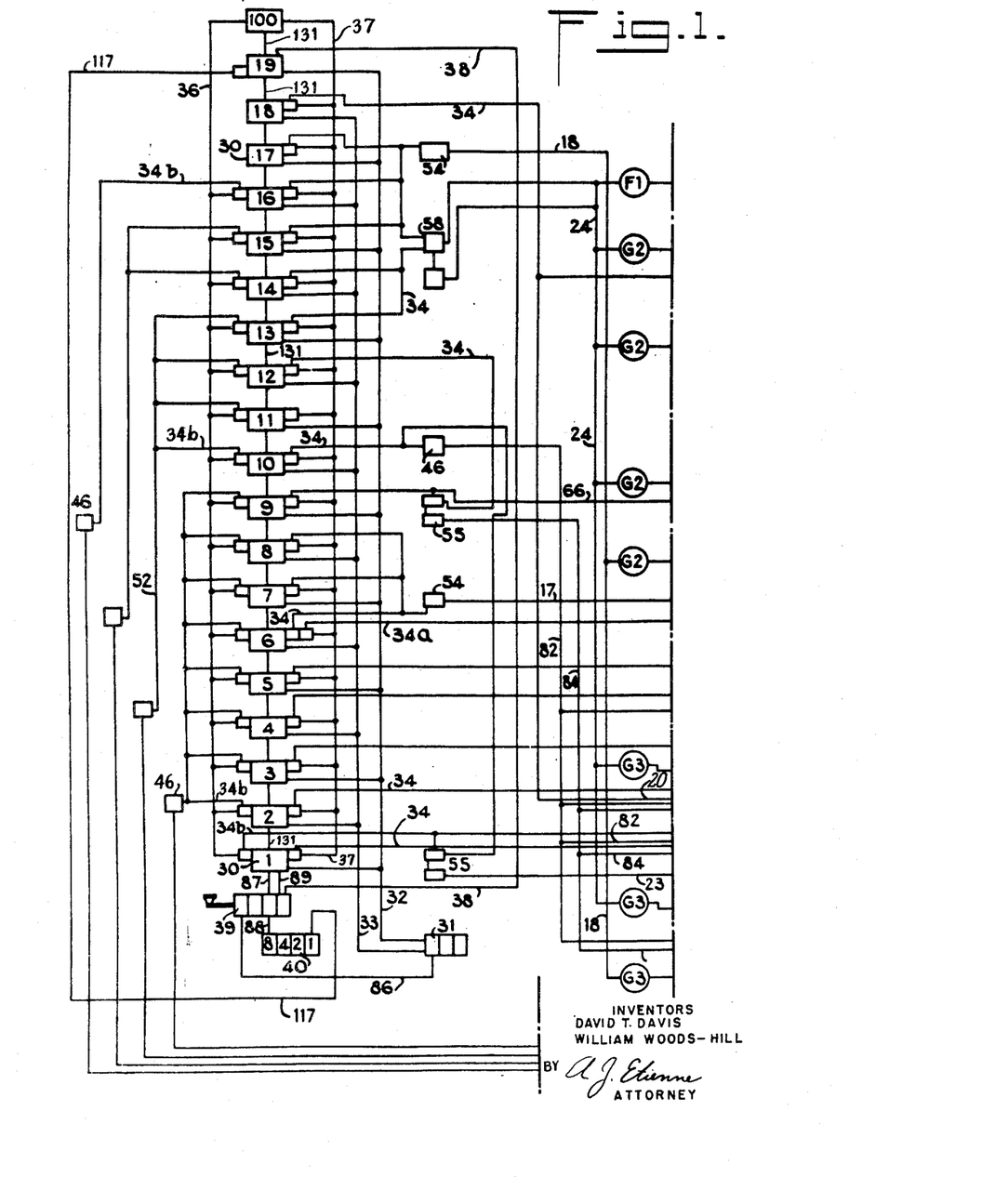
Figures 1 and 1a taken together with Figure 1 at the left and 1a at the right comprise a block diagram of the complete electronic multiplying device.
Figure 1A:
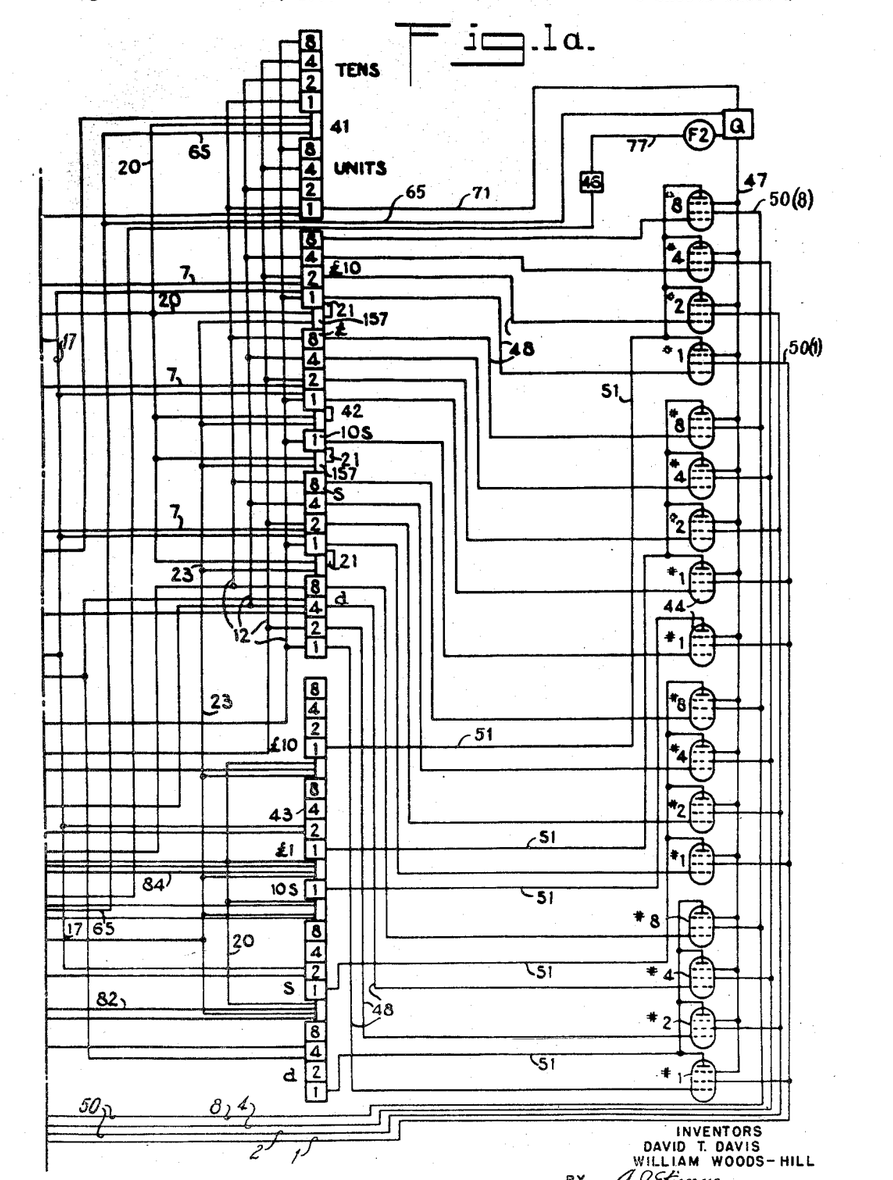

Referring to Figures 1 and 1a, the complete multiplying device consists essentially of four major parts, a multiplier register 41 of tens and units orders, a multiplicand register 42 of tens of pounds, pounds, tens of shillings, shillings and pence, a product counter 43 of tens of pounds, pounds, tens of shillings, shillings and pence, an emitter 30 consisting of nineteen units, a half cycle trigger control unit 100, a pulse generator 31 which includes a multivibrator (MV), a start control circuit 39 including a start key and a cycle counter 40.

Entry of values into the multiplier and multiplicand registers is made in the binary code of 1, 2, 4, 8 in each denomination. Thus to enter the value 7 in a denomination of the multiplicand register, a pulse is applied to the lines 11 (Figure 8) marked 1, 2 and 4, thus setting the trigger units representing #1, #2 and #4, as described later.

The first half cycle of the emitter is employed, as described in detail later, to test the original MP value, before it is halved, for odd or even. If it be odd, the transfer pentodes 44 are rendered operative so that during the first half cycle, the original value of the MC, before it is doubled, is transferred, as described in detail later, to the products counter.

The multiplier register is so arranged that after the first half cycle upon applying control pulses from the emitter, the value standing in the register may be halved, and under control of pulses from the emitter the value standing in the multiplicand register may be doubled. Thus under control of the emitter, the entered multiplier value is halved and simultaneously the entered multiplicand value is doubled. The two units F2 and Q together (Fig. 1a) form the odd-even control and determine whether the halved value standing in the multiplier register is even or odd and control the transfer of the doubled value in the multiplicand register to the product counter. If the multiplier value is odd, then the odd-even control allows the doubled multiplicand value at that time to be transferred from MC register 42 to PR register 43 via the gates generally indicated at 44.

Having transferred this doubled MC value to the products counter, the halving and doubling is carried out a second time, providing a second doubled value which may be transferred and added to that already in the products counter, to successively build up the final product in the manner shown in the example. These operations of halving, doubling, and transfer to the products counter, if the halved value is odd, are continued for a fixed number of cycles. The number of cycles is determined by the cycle counter 40 and is sufficiently large to ensure that the greatest number which can be entered in the multiplier register will have been reduced to unity by successive halving when the cycle counter causes the operations to cease. It may happen that the multiplier register reaches unity at some cycle earlier than the last. On the next cycle the multiplier register will be reduced to zero and remain so set for the remaining cycles. Since zero is sensed by the odd-even detector as an even number, no entries will be made into the products counter after the one when the multiplier register has reached unity, thus retaining the correct answer even though additional cycles occur between the obtaining of the answer and the cessation of operations.

The nineteen emitter units 30 provide impulses and voltages to control the operation of the registers and the product counters. The units operate in succession in the order 1 to 19 and this operation occupies the first half of one multiplying cycle. The half cycle control unit 100 enables the same nineteen emitter units to provide a further group of impulses controlling the second half of the multiplying cycle, in a manner to be described.

Pulse generator

Figure 3:
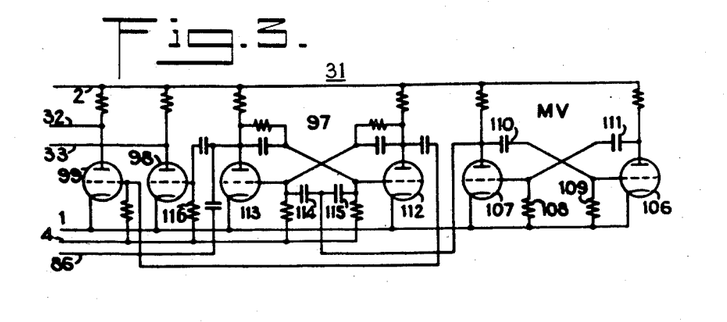
Figure 3 is a circuit diagram of the pulse generating circuit, including a multivibrator, all indicated generally as 31 in Figure 1.

This unit is indicated generally as 31 in Figure 1 and the circuit is shown in detail in Figure 3. The function of the unit is to provide a series of pulses of uniform amplitude and recurrence frequency to control the relative time relationship of the various functions performed during a multiplying operation.

The two triodes 106 and 107 with the cross-coupling networks of condenser 110—resistor 109 and condenser 111—resistor 108 form a relaxation oscillator or multivibrator which operates in a well known manner to produce at the anode of triode 107 voltage variations of substantially square wave form. These two resistor-condenser networks form the frequency determining elements and have equal time constants so that the durations of the positive and negative half-cycles of the square wave form are equal.

This square wave is applied through condensers 114 and 115 to the grids of the triodes 113 and 112, which together form the trigger circuit 97. This input switches the trigger 97 through the "on" and "off" states for each cycle of the square wave, producing at the triode anodes a voltage variation which is also of square wave form, but approaches more nearly to the ideal square wave form than the input.

Figure 4:
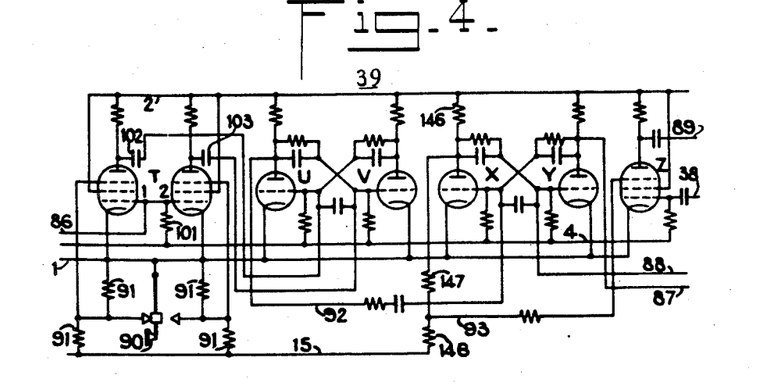
Figure 4 is a circuit diagram of the start control circuits indicated generally as 39 in Figure 1.

When triode 113 becomes non-conducting, a positive pulse is applied to the grid of the tube 98. This tube is normally non-conducting, since the grid is connected through resistor 116 to the negative bias line 4, but the amplitude of the applied positive pulse is such that the tube conducts on the peak of the pulse, producing a square negative-going pulse of uniform amplitude in the anode circuit. When triode 112 becomes non-conducting, by similar action a negative pulse is produced at the anode of tube 99. Since triodes 112 and 113 become non-conducting alternately, negative pulses will be produced on lines 32 and 33 alternately. The pulses on lines 32 and 33 are employed for the successive resetting of the emitter units, as will be explained. In addition, positive pulses are applied via line 86 from the anode of triode 113 to the control grids of the pentodes T1 and T2 in the start control unit (Figure 4).

*Start control*

This unit indicated generally as 39 in Fig. 1 governs the initial starting of the emitter units for performing a multiplication operation, the successive emitter cycling and the final stopping of the emitter at the completion of the requisite number of cycles.

The two pentodes T1 and T2 (Figure 4) to whose control grids plus pulses are applied via line 86 as stated above have these grids joined together and connected to bias line 4 through resistor 101. The suppressor grid of T1 is connected to the mid-point of the left-hand potentiometer formed by the two equal resistors 91 and the suppressor grid of T2 is similarly connected to the right hand potentiometer. These two potentiometers are connected between the earth line 1 and the main negative supply line 15. In the normal position the key 90 by-passes a resistor 91 and connects the suppressor grid of T1 directly to line 1. The suppressor grid of T2 is biased beyond cut off by the potential developed across the right hand upper resistor 91, and the control grids of T1 and T2 are also biased beyond cut off by the potential of line 4.

The above mentioned positive pulses applied to the grids of T1 and T2 from the pulse generator (Figure 3) via line 86 are of such amplitude that with key 90, as shown, a negative pulse is produced at the anode of T1 and applied to the grid of the trigger tube U through condenser 102. Since the anode current of T2 is cut off by the bias on the suppressor grid, no pulse appears at its anode. Thus the negative pulses applied to the grid of tube U ensure that it is non-conducting and thus that V is conducting which is contrary to the generally normal status of these triggers.

When the key 90 is momentarily depressed, the suppressor grid of T2 is connected to earth and the suppressor grid of T1 biased beyond cut off. Accordingly, the next positive pulse on line 86 causes T2 to pass anode current and the negative pulse at its anode is applied to the grid of tube V through the condenser 103. This causes V to become non-conducting and the trigger UV switches over to the other stable state, with U conducting and V non-conducting. The conduction of tube U causes a drop in voltage at the anode and consequently a negative pulse is sent via line 92 to another trigger circuit consisting of tubes X and Y. This pulse switches this circuit from the normal state, with X conducting and Y non-conducting, to the opposite state with Y conducting and X non-conducting. As a result of the drop in potential at the anode of tube Y, a negative pulse is applied via line 87, and condenser 104 (Figure 2) to the grid of tube 105 of trigger unit (1) of the emitter chain, to switch this trigger to the reverse condition. At the same time, cessation of anode current in tube X (Figure 4) reduces the potential drop across resistor 146. The resistors 146, 147 and 148 form a potentiometer between the H. T. line 2 and the main negative supply line 15, so that the potential at the junction of resistors 147 and 148 also rises. Line 93 joins this junction to the suppressor grid of gate Z, which therefore undergoes a similar rise in potential. The resistor chain is so proportioned that when tube X is conducting, the potential applied to the suppressor grid of tube Z is more negative than the cut off value and when X is non-conducting, the suppressor grid of Z is at approximately cathode potential. This conditioning of the suppressor grid of this gate Z cooperates with a plus pulse on the control grid as described later to produce a negative output pulse on line 89 to initiate all operations of the emitter subsequent to the first key operated.

When key 90 is released, T1 becomes capable of conduction once more, so that negative pulses are applied to tube U and the trigger circuit UV is switched back to the normal condition. However, as will be explained in connection with the emitter units, the resulting positive pulse on line 92 is not effective to switch trigger circuit XY, which remains with X non-conducting. Thus depression of the key 90 has resulted in a pulse being applied to emitter unit (1) and the trigger XY being switched to the reverse state, bringing the suppressor grid of gate Z to approximately cathode potential. The trigger XY remains in this state until the end of the multiplying operation, when a pulse from the cycle counter 40 is applied via line 88 to the grid of tube Y to switch the trigger circuit back to its normal state at which time the whole start control unit has returned to the normal state.

*Cycle counter*

As stated above, the multiplying device performs a fixed number of cycles irrespective of the actual value of the factors. The cycle counter 40 (Figure 1) shown in detail in Figure 12, determines the number of cycles performed.

The counter consists of four trigger stages 94 (Figure 12) arranged to form a binary counter, the stages representing respectively the values 1, 2, 4 and 8. Each stage consists of two triodes cross-coupled by a network of resistors and condensers in such a way that the circuit possesses two stable states, with either the first triode conducting and the second non-conducting, or the first non-conducting and the second conducting. The #1 trigger state 94 representing the value "1" will be considered as an example. The resistors 129, 126 and 120 form a potentiometer between the H. T. line 2 and the negative bias line 4. The anode of triode 118 is connected to the junction of 129 and 126 and the grid of triode 119 is connected to the junction of 126 and 120. The resistors 128, 127 and 121 form a similar potentiometer to which the anode of 119 and the grid of 118 are connected. By suitably choosing the values of the resistors forming the potentiometer chains, the additional voltage drop across resistor 129 caused by triode 118 conducting fully, lowers the potential at the junction of 126 and 120 sufficiently to drive the grid of triode 119 considerably more negative than the cut-off value. Triode 119 is consequently drawing no anode current and the potential at the junction of resistors 121 and 126 is such that triode 118 is kept conducting fully. Since the circuit is symmetrical, it will be appreciated the reverse state of the tube conduction will result in a second stable state. If a negative pulse is applied to the grids of 118 and 119 via line 117 and the two condensers 122 and 123, the conducting triode will be cut off and in consequence the trigger stage will be switched over to assume the other stable condition. The condensers 124 and 125 assist in ensuring a rapid switch-over from one state to the other. A similar type of trigger stage is used in other parts of the apparatus; for example the trigger 97 of the pulse generator shown in Figure 3, and it may be noted that the mode of operation is the same. Unless the contrary is stated, it is assumed that when a trigger stage is in the normal or "off" state, the left hand tube is conducting and the right hand non-conducting.

Figure 12:
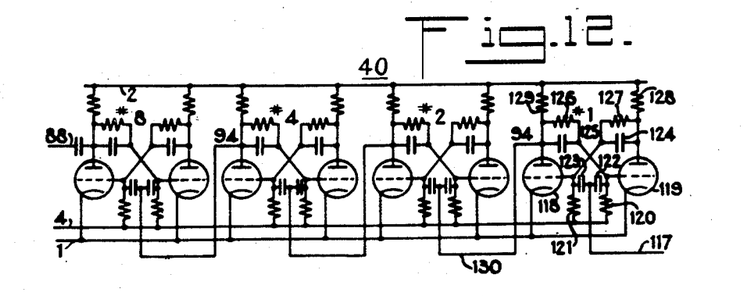
Figure 12 is a circuit diagram of the cycle counter 40 of Figure 1.

When a pulse is applied to line 117, trigger stage #1 will be switched from the "off" to the "on" state, with the result that a positive pulse is applied via line 130 to the grids of the tubes comprising the next trigger stage, but is ineffective to switch it. However, on receipt of a second pulse on line 117 the #1 trigger stage is switched back to the "off" state and the resulting negative pulse on line 130 switches trigger stage #2 "on." It will be apparent that the other trigger stages will operate similarly and that the four stages together constitute a binary counter counting up to sixteen, any value being represented by the appropriate stage or stages being in the "on" condition.

The line 117 (Fig. 1) is connected to the last (19) of the emitter units 30 (Figure 1) and as will be explained, receives one pulse for each multiplying half cycle. Thus the counter will have received sixteen pulses when the emitter has completed eight full cycles. This sixteenth pulse switches trigger #8 back to the "off" state, so that a negative pulse is applied via counter output line 88 to the control grid of conducting triode Y in the start control circuit (Figure 4) to reset trigger stage XY, which has the effect of allowing a further half cycle to take place but prevents the emitter unit (1) from commencing a further cycle.

Emitter unit

The emitter chain consists of nineteen units, generally designated 30 (Figure 1) and individually numbered 1 to 19. The units all perform the same function of supplying controlling pulses and voltages and are generally similar in operation. The circuit of the first unit 30(1) will be described with reference to Figure 2 and then modifications in other emitter units will be noted.

The two triodes 105 and 132 (Figure 2) form a trigger stage with two stable states, generally similar to those of the cycle counter (Figure 4). However, in this case two input lines are provided, one going to the grid of each tube, and a condenser 135 is connected between the two grids to aid in ensuring stability and correct operation. From the anode of tube 105, a line 131 connects to the grid of another similar tube 105 in the next emitter unit 30(2) and a further line 136 from the anode connects to the control grids of the two gates 134 and 133.

Figure 2:
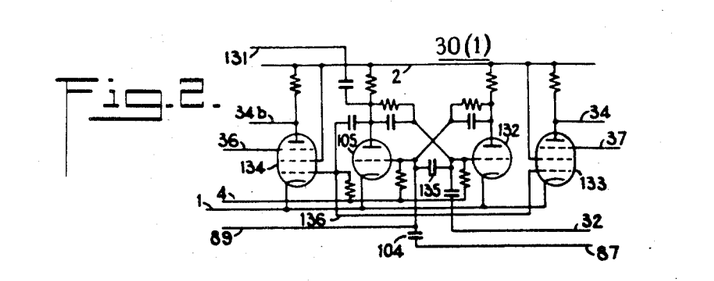
Figure 2 is a circuit diagram of one emitter unit 30(1) of Figure 1.

When the start control unit is key operated as described above, a negative pulse is applied to the grid of triode 105 via line 87 from tube Y (Figure 4). This pulse makes triode 105 non-conducting, and switches the trigger stage 105 and 132 over to the "on" state with triode 132 conducting. From the anode of triode 105 a positive pulse is applied to the control grids of gates 134 and 133 via line 136. At this time the line 36 conditioned by the half cycle control trigger 100, as described later, is at a potential nearly equal to the cathode potential of gate 134, while line 37 is considerably negative with respect to the cathode of gate 133. The control grids of both tubes are normally biased negatively by the connection to the bias line 4. Accordingly, the positive pulse on line 136 results in a negative pulse appearing at the anode of 134 on line 34b and no output at the anode of 133 on line 34, since the anode current is cut off by the negatively biased suppressor grid. Following this, a negative pulse is applied to the grid of triode 132 from the pulse generator via line 32, causing 132 to become non-conducting, thus switching the trigger stage 105, 132 back to the normal or "off" state with triode 105 conducting which produces a negative pulse on line 131, which is applied to the grid of the triode 105 in the next emitter unit 30(2), causing that trigger stage to switch "on". This unit in turn will produce a pulse on the appropriate line 34b and then be switched back to the normal state by a negative pulse on line 33 (Fig. 1) from the pulse generator, thus switching emitter unit 30(3) to the "on" state. In this manner, the emitter units are successively switched to the "on" state, and then back to the normal state. The odd numbered emitter units, that is 30(1), 30(3), etc. are connected to line 32 as shown in Fig. 1 and the even numbered emitter units to line 33. As has been explained, pulses are produced alternately by the pulse generator on the lines 32 and 33, and thus sequential operation of the units is effected. Since triode 132 is normally non-conducting, the pulses from the pulse generator will only be effective to switch "off" the unit which has already been switched "on."

The emitter units switch on and off in succession until unit 30(19) is reached. When this unit switches off, a negative pulse is sent via line 117 (Figs. 1 and 12) to enter the value "1" in the cycle counter 40 and a positive pulse is sent via line 38 (Figures 1 and 4) to the control grid of gate Z in the start control unit. As described already, the suppressor grid of this gate is at this time at approximately cathode potential, so that this positive pulse on the control grid will produce a negative pulse at the anode, which will be transmitted via line 89 to the grid of triode 105 in emitter unit 30(1), see Figure 2, switching this unit "on" and commencing another half cycle. Additionally, the line 131 from unit 30(19) goes to the half cycle trigger control unit 100 (Figure 1) serving to switch this unit to the "on" state. This results in the potentials of lines 36 and 37 being reversed, so that line 36 is now considerably negative and line 37 near cathode potential. Accordingly, during this half cycle the gates 133 (Fig. 2) in each emitter unit will be operative to produce negative pulses on lines 34. It will be understood that operation continues in this cyclic fashion until the cycle counter 40 via its output line 88 (Fig. 4) resets trigger XY (Fig. 4) in the start control circuit, putting the suppressor grid of gate Z below cut-off and thus preventing the transmission of the pulse from unit 30(19) to unit 30(1) through gate Z.

In all the emitter units except unit 30(1), the two input lines 87 and 89 are replaced by the one line 131 from the next lower unit. It is required that two isolated outputs be obtainable from unit 30(6) so that a further gate similar to gate 133 of Fig. 2 is provided, wired in parallel with 133, except for the anode circuit which provides the separate output shown as line 34a (Figure 1). For the units 30(17), 30(18) and 30(19), one output line only is required and the gate 134 is omitted for (17) and (18) and gate 133 for (19) (see Figure 1). The emitter unit 30(19) also has the line 38 connected to the anode of triode 132 of the trigger of this unit, to provide a positive pulse to gate Z.

Auxiliary control unit 54

Figures 5, 10:
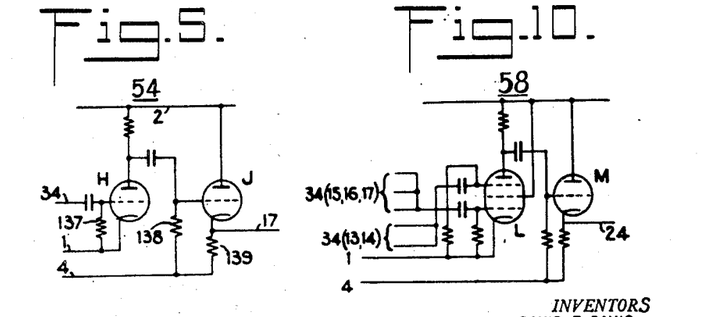
Figure 5 is a circuit diagram of one of the auxiliary control units each indicated as 54 in Figure 1.
Figure 10 is a circuit diagram of the auxiliary control unit 58 of Figure 1.

One of the units designated 54 in Figure 1 which includes a cathode follower is shown in detail in Figure 5.

The triode H is normally conducting fully, since the grid is connected to the cathode through resistor 137. The grid of triode J is connected to the bias line 4 through resistor 138, and the cathode through resistor 139. The cathode resistor is sufficiently large to ensure that the anode current is nearly cut off, due to the self-bias voltage developed across the resistor. A negative pulse is applied to the grid of tube H from an emitter unit via line 34, resulting in a positive pulse at the anode. This appears at the grid of tube J and also with slightly reduced amplitude at the cathode, since the tube acts as a cathode-follower. Hence, line 17 is normally negative with respect to line 1, and carries a positive-going pulse when line 34 transmits a negative pulse to the grid of tube H.

Auxiliary control unit 55

Figure 6:
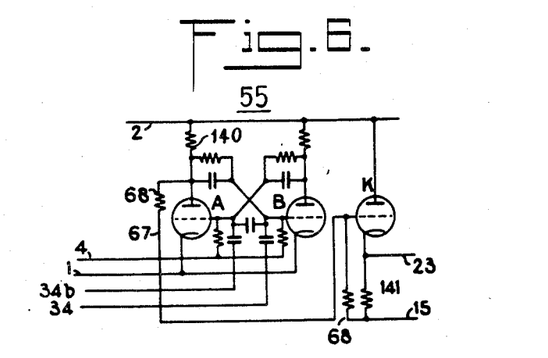
Figure 6 is a circuit diagram of one of the auxiliary control units each indicated as 55 in Figure 1.

That auxiliary control unit connected to emitter unit 30(1) is shown in Fig. 6 and comprises the triodes which form a trigger stage of the type already described. The trigger is switched to the "on" state by a negative pulse applied by 30(1) to the grid of tube A via line 34b. The resistor 140 and the two similar resistors 68 form a potentiometer between the H. T. line 2 and the main negative supply line 15. Whne tube A becomes non-conducting, the potential of the grid of tube K will rise. Similarly to tube J (Figure 5), the tube K is normally only conducting to a small degree due to the self-bias action of cathode resistor 141, so that when the grid potential rises, the cathode potential rises also, and the line 23 will remain at this higher potential until a pulse from 30(12) on line 34 on the next half cycle of the emitter makes tube B non-conducting and switches the trigger AB back to the normal state. The unit 55 connected to 30(9) is similar except it operates during a single half cycle.

Auxiliary control unit 58

The purpose of this unit, shown in detail in Figure 10, is to enable pulses to be applied to both decimal and duo-decimal denominations without commoning occurring between the lines 34 from the emitter units 30(13) to 30(17). The grid and suppressor grid of pentode L are both at cathode potential so that when negative pulses are applied on any of the input lines 34, a positive pulse is produced at the anode. This pulse will be reproduced at slightly reduced amplitude at the cathode of the cathode follower triode M and hence on the line 24.

Half cycle control unit 100

This unit, as already explained, is a trigger unit used to control the suppressor grid potentials of lines 36 and 37 and thus of the sets of gates 133 and 134 of the emitter units so that one or other set acts as amplifiers and gates of the pulses produced by the trigger stages of the emitter units.

The unit consists of a trigger stage similar to trigger 37 of the pulse generator in Figure 3, with an input line 131 from emitter unit 30(19). From the anode of one of the trigger triodes, a connection is made to a cathode follower tube similar to that designated K in Figure 6. From the anode of the other trigger triode, a connection is made to a similar cathode follower. The lines connecting to the cathodes of the cathode followers, corresponding to line 23 in Figure 6, are respectively the lines 36 and 37 of Figure 1. Since one of the trigger triodes will be conducting fully, and the other non-conducting, one of the lines, say 37, will be at minimum potential and the other, line 36, at maximum potential as assumed above during the first half cycle of operation. When the trigger stage is switched to the opposite state by the pulse from emitter unit 30(19), the line 37 will assume the maximum potential and the line 36 will assume the minimum potential, thus changing over the operation of the sets of tubes 133 and 134.

Multiplier register

Figure 7:
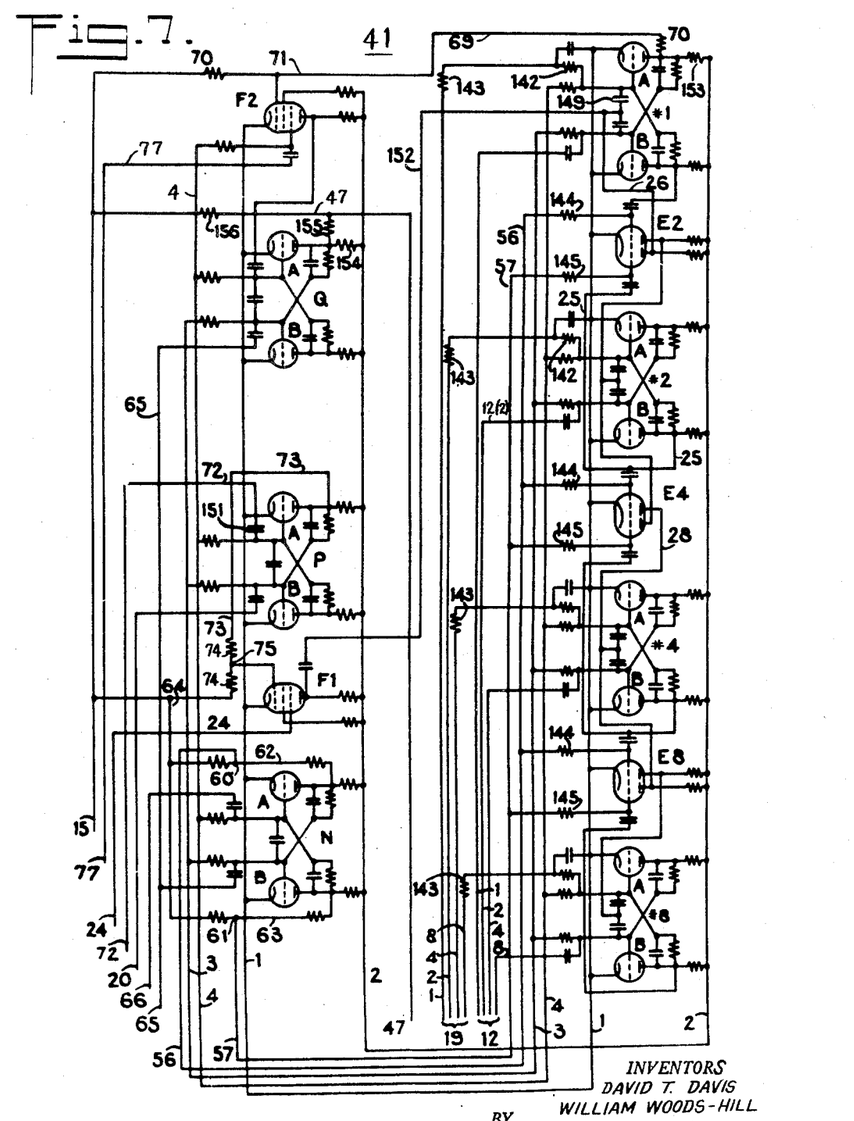
Figure 7 is a circuit diagram of one denomination of the multiplier register indicated as 41 in Figure 1 and of the odd-even detector, indicated as F2 and Q in Figure 1.

This is shown in Figure 1a as comprising two decimal denominations and the lowest denomination is shown in detail in Figure 7.

The register comprises four trigger stages, each consisting of the two tubes A and B and operating in the manner already described. The stages represent respectively the values #1, #2, #4 and #8 and are so designated in Figure 7. The multiplier value is originally entered by applying a negative voltage to the appropriate line or lines of the group 19. Thus, to enter the value 3, a negative voltage would be applied to line 19(1) and line 19(2). The normally conducting tubes A in the related trigger stages will be cut off, since the grids of these tubes are connected to the lines 19 via the resistors 142 and 143, and these stages will switch to the "on" state. The voltages for effecting the initial entry may be derived from the closure of the contacts of a keyboard, the closure of the contacts of a set of entry relays or other suitable means.

Although the register stages represent the values 1, 2, 4, and 8, and the multiplier is entered in this code, the maximum value to be recorded in any denomination is 9. Since the stages represent the values of a binary series, each stage represents half the value of the next higher stage. In order to halve the value in the register, it is necessary that any trigger stage in the "on" state should be reset, and that in resetting it should switch the next lower trigger stage to the "on" state. In the case of the #1 trigger stage, however, the halved value is equal to the value five in the next lower denomination. However, to add five in the lower denomination requires that the stages in this denomination be capable of acting as a normal counter, that is, each stage influencing the next higher stage. To allow of this dual functioning, each of the trigger stages within a denomination is coupled to the next by the twin triode tubes E2, E4 and E8.

The two tubes A and B comprising the trigger stage N control the operation of the register in the following manner. When the tube A is conducting and tube B non-conducting, the junction 60 of the chain of resistors between line 2 and line 15 will be at a lower potential than the junction 61 of the similar chain to which the anode of tube B is joined. When tube B is conducting and tube A non-conducting, then the junction 61 will be lower in potential than junction 60. The method of operation of the circuit will be understood from similar circuits already described.

Line 56 connects point 60 to the left hand grids of the triodes E2, E4 and E8 through resistors 144. Line 57 similarly connects point 61 to the right hand grids through resistors 145. When point 60 is at the lower potential and point 61 at the higher, then the grids of the left hand triodes of E2, E4 and E8 are biased very considerably beyond cut-off and the right hand triodes are biased just to cut off. Under these conditions, a positive pulse produced on line 25 by trigger #2 switching back to the normal state, will overcome the bias of the right hand triode of E2 and produce a negative pulse at the anode of that triode but will be unable to drive the grid of the left hand triode of E4 more positive than cut-off, and hence no pulse will appear at the anode. The negative pulse at the anode of E2 is transmitted via line 26 to the grids of the trigger #1, through the two condensers 149 and 150, to switch the trigger over to the opposite state. Thus with tube A of trigger stage N conducting, the triggers #2, #4 and #8 of the register may effect the switching of the next lower stage.

When tube B of trigger N is conducting, the left hand triodes of E2, E4 and E8 will be operative by a positive pulse. A positive pulse for example from the anode of tube B of trigger #1 will be transmitted by the left hand triode E2 to trigger #2 to switch it to the opposite state. Thus in this case a trigger stage of the register is now able to effect switching of the next higher stage.

At the beginning of the second half cycle of multiplication, a negative pulse from the emitter unit 30(1) is transmitted to the grid of tube B of trigger N via line 65, to switch it to the normal state with tube A conducting. A negative pulse is next applied from the emitter unit 30(2) as described later to trigger #1 via line 12(1). If this trigger stage has been set, it will be switched back to the normal state, and if it is in the normal state it will be unaffected. A pulse is next applied via 30(3) to trigger #2 via line 12(2) to effect similar switching action. If the trigger is switched to normal, then a pulse will be transmitted via right hand triode E2 to set trigger #1, as already explained, since trigger stage N is set at this time to make the right hand E triodes operative. The remaining register trigger stages in a denomination are similarly pulsed successively, so that after this has taken place any of the triggers #2, #4, #8 set by entry will have set the next lower trigger and itself been returned to normal, that is, the value will have been halved. In the case of trigger #1, however, provision must be made for effecting an entry of five in the next lower denomination, if this #1 trigger was set by the entry.

The trigger #1 in each denomination, except the units, is without the resistor 70 and connecting line 69. Instead, line 72 is joined directly to the anode of tube A of trigger #1 and connects it via a condenser 151 (Figure 7) to the grid of tube A in carry trigger stage P. When trigger #1 switches back to the normal state, the resulting negative pulse switches carry trigger stage P "on." From previous description, it will be understood that the junction 75 of the two resistors 74 will rise in potential to bring the control grid of gate F1 to approximately cathode potential. After the halving operation has been completed, a further emitter pulse on line 66 from 30(9) switches trigger N to the "on" state, making operative the left hand E tubes. Five emitter pulses on line 24 are applied to the suppressor grid of gate F1, producing five pulses at the anode, which are transmitted to trigger #1 of the lower denomination by line 152, to effect the entry of value five in this denomination. This is possible since the left hand E tubes are now operative; thus after two pulses, trigger #1 will set trigger #2. After four pulses trigger #1 will reset trigger #2, which will set trigger #4. The fifth pulse will set trigger #1 so that triggers #1 and #4 are now set, representing the value five. This example assumes that these trigger stages were unset before the application of the five pulses. Such carry circuits consisting of a trigger P and a controlled gate F1 are provided for each denomination except the units denomination. It will be appreciated that the carry circuit shown in Figure 7 is actually that which effects the carry between the tens and units denominations.

Since during the halving operation the trigger stages are pulsed via the lines 12 in the order 1, 2, 4, 8, each stage in a register order will have been reset prior to the time at which it may be set by the resetting of the next higher trigger stage of the same order. Furthermore, the carry of value five to the next lower denomination, occurs after the completion of the halving operation, at which time the maximum value which may be standing in the register is four, so that after the addition of the carry, the maximum value is nine.

In the lowest denomination, no carry circuit is required, but it is necessary to determine whether trigger #1 is in the "on" or "off" state, to indicate whether the value in the multiplier register is odd or even. This function is performed by pentode F2 and trigger stage Q (Figure 7). The resistor 153, and the two resistors 70 form a potentiometer between line 2 and line 15. When trigger #1 is "on," tube A is non-conducting, and the control grid of pentode F2 assumes a potential approximately equal to that of the related cathode. The suppressor grid of F2 is normally biased to cut off by the connection to the bias line 4. However, if a positive pulse from the emitter is applied to the suppressor grid via line 77, and at the same time the control grid is near cathode potential, a negative pulse is produced at the anode of pentode F2. This pulse is applied to the grid of triode A of trigger stage Q, cutting A off and switching the trigger "on." The three resistors 154, 155, 156, form a potentiometer between line 2 and line 15, so that when triode A becomes non-conducting, the potential of line 47 (see also Fig. 1) rises. Line 47 is connected to the product transfer tubes 44 so that when trigger #1 of the units denomination of the multiplier register is "on", the increased potential of this line 47 allows the transfer tubes 44 to become operative to transfer the values in the multiplicand register to the products counter.

Multiplicand register

Figure 8:
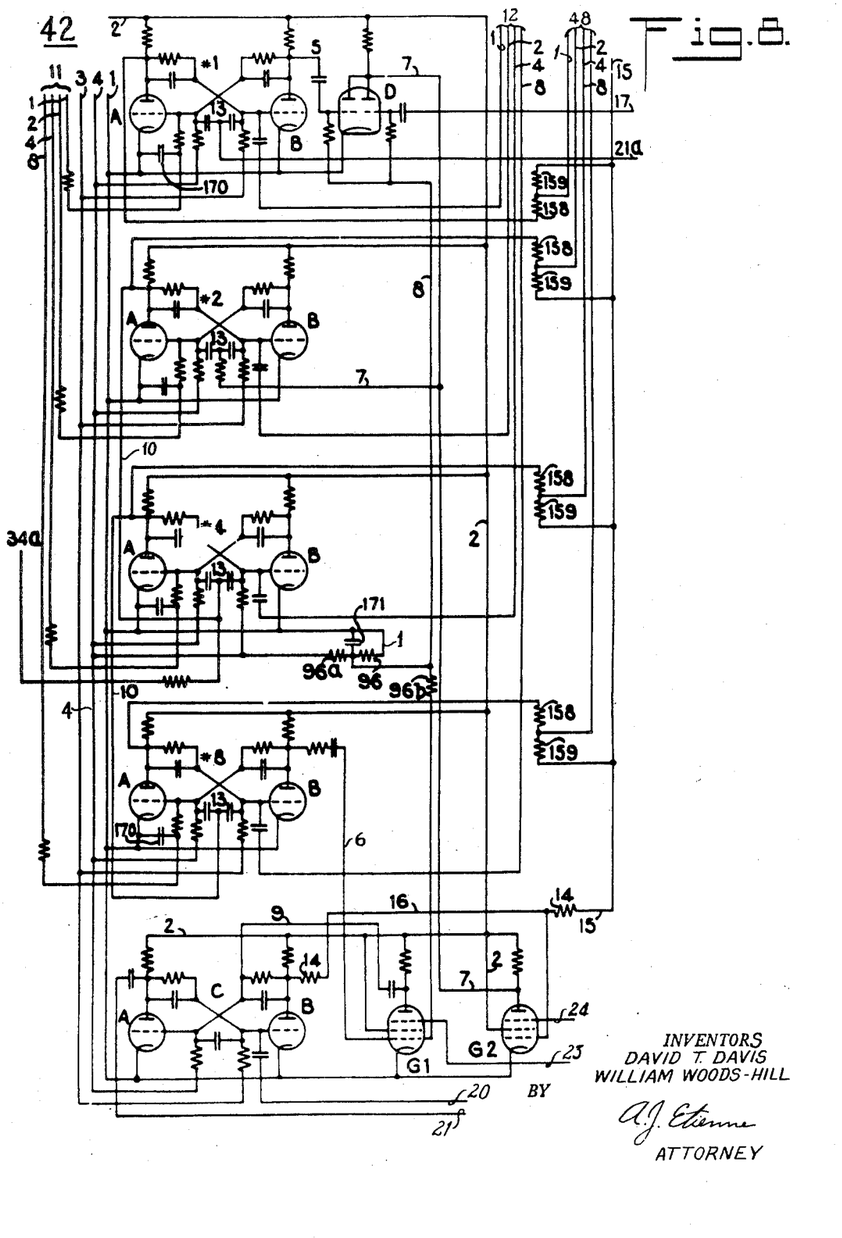
Figure 8 is a circuit diagram of one denomination of the multiplicand register indicated as 42 in Figure 1.

One denomination of the multiplicand register indicated generally as 42 in Fig. 1 is shown in detail in Figure 8. It consists of four trigger stages, similar in general to those of the multiplier register, representing the values 1, 2, 4, 8. The initial entry is made by applying a negative voltage to the appropriate lines 1, 2, 4, 8 of the group 11.

The carry circuit between denominations comprises the trigger stage C (Figure 8) and a gate G1 and is indicated as 157 in Figure 1. The control grid of pentode G1 is biased negatively by connection through resistor 96b to the junction of resistors 96 and 96a which form a potentiometer between the bias line 4 and line 1. If trigger #8 is switched from "on" to "off," a positive pulse will be produced on line 6 and transmitted to the control grid of gate G1. At the time when a carry is to be accepted, line 23 from the emitter is holding the suppressor grid of G1 (see Voltage To Open Gates G1 And G4, Fig. 13) at approximately the same potential as the cathode. Accordingly, the positive pulse on the control grid of G1 produces a negative pulse at the anode which is transmitted via line 9 to the grid of tube A of carry trigger C to switch this trigger "on." After the doubling operation has been completed as described presently, a negative pulse from the emitter is applied via line 20 to the grid of tube B of trigger state C (see Pulse To Reset Triggers C in 42 And 43 And Trigger P in 41, Fig. 13) to reset it back to the normal state. The resulting conduction of tube A produces a negative pulse on line 21, which is transmitted to the grids of trigger #1 of the next higher denomination, as indicated by line 21a in Figure 8, effecting the switching of this trigger and so entering the value one.

The doubling of the value in the MC register is effected by applying negative pulses in succession (see Pulse To Multiplier #1 And Multiplicand #8, etc., Fig. 13) along the lines 12 in the order 8, 4, 2, 1. If trigger #8 of multiplicand is "on," then the negative pulse applied by line 12(8) to the grid of tube B will switch it to the normal state, and the carry trigger stage C will be set, as already described. If trigger #4 of the multiplicand is "on," then in switching over it will produce a negative pulse on line 10 which will switch trigger #8 "on." A similar action occurs with trigger #2, which may set trigger #4. In the case of trigger #1, in switching to normal it will produce a positive pulse at the anode of tube B, which, via line 5, will be transmitted to the left hand grid of the double triode isolating valve D. This will produce a negative pulse at the anode, which, via line 7, will cause the switching of trigger #2.

Although decimal values, expressed in the binary code 1, 2, 4, 8 have been entered in the register, the register is a binary counter registering up to 16. Hence, after doubling has taken place, the values may no longer be correctly represented in a decimal scale, and a correction must be performed in the following manner. Firstly, three positive pulses from the emitter (6) (7) (8) of emitter and auxiliary control 54 are transmitted via line 17 to the right hand grid of double triode D. Three negative pulses are produced at the anode and via line 7, switch the trigger #2 three times, thus entering 6 into the register. The value in the register has now been corrected to a scale of 16 and if the value initially was greater than 9 and less than 16, the carry trigger C will have been set and the correct decimal remainder will be registered. For example, if the original value was 14, then after the addition of 6, a carry will be registered together with a value of 4. If, however, the original value was 9 or less, then no carry will have been registered and the value standing in the register will be too great by 6. To obtain the correct registration, a second addition must be made, this time of the value 10. Thus a total of 16 will have been added, and since the register counts to sixteen, the original entry value will result, and thus the correct value will be obtained, provided that the carry stage is rendered inoperative during this addition, to prevent the registration of the false carry which is produced. For example, if the original entry was 4, the addition of 6 gives the value 10, a further addition of 10 gives the value 20, which is registered as 4 and a false carry, which is suppressed.

The addition of ten is carried out as follows. If the trigger stage C has not been set, then tube B will be non-conducting and the control grid of gate G2 will be brought to approximately the same potential as the related cathode, by the connection of the grid to the junction of the two resistors 14. Five positive pulses from the emitter are transmitted to the suppressor grid of valve G2 by line 24, producing five negative pulses at the anode which are transmitted to the grids of trigger #2 by line 7 to switch the #2 trigger five times, thus entering the value ten. At this time, the voltage of line 23 has been lowered to keep the suppressor grid of gate G1 below cut-off and thus prevent the transmission of a pulse from trigger #8 to carry trigger C. If the carry trigger C has been set prior to the addition of ten, the control grid of gate G2 will be held below cut off potential, so that although five pulses are applied to the suppressor grid, they will not appear at the anode and an entry of ten will not occur.

When a duo-decimal register is required, as for example for dealing with pence, then four and twelve are added instead of six and ten, in order to obtain a correct registration. Thus, in the duo-decimal system considering the previous examples, an entry of 14, after the addition of 4, becomes a registration of 2 and a carry; an entry of 4 after the addition of 4 becomes 8, and after the addition of 12, becomes 20, which gives a registration of 4 and a carry, which is suppressed. In order to effect the entry of 4 in the register, a negative pulse from the emitter is applied via line 34a to the grids of trigger #4, while line 17 is not connected in that denomination (Figures 1 and 8). The anode of gate G2 is disconnected from line 7 and connected to the junction 13 of the two condensers of trigger #4. Three pulses instead of five are applied to line 18 which physically replaces line 24 (see Fig. 1), thus entering the value twelve in the register.

When any of the triggers is "on," tube A will be non-conducting and the potential at the junction of the resistors 158 and 159 will be at approximately the potential of line 1. Through the lines 48, the grid of the related product transfer valve (44 of Fig. 1) will be maintained at approximately cathode potential, since the cathodes of all these valves are connected to line 1. When tube A is conducting, the line 48 becomes sufficiently negative in potential to ensure that the grid of the related transfer valve 44 is below cut off.

Product counter

Figures 9, 11:
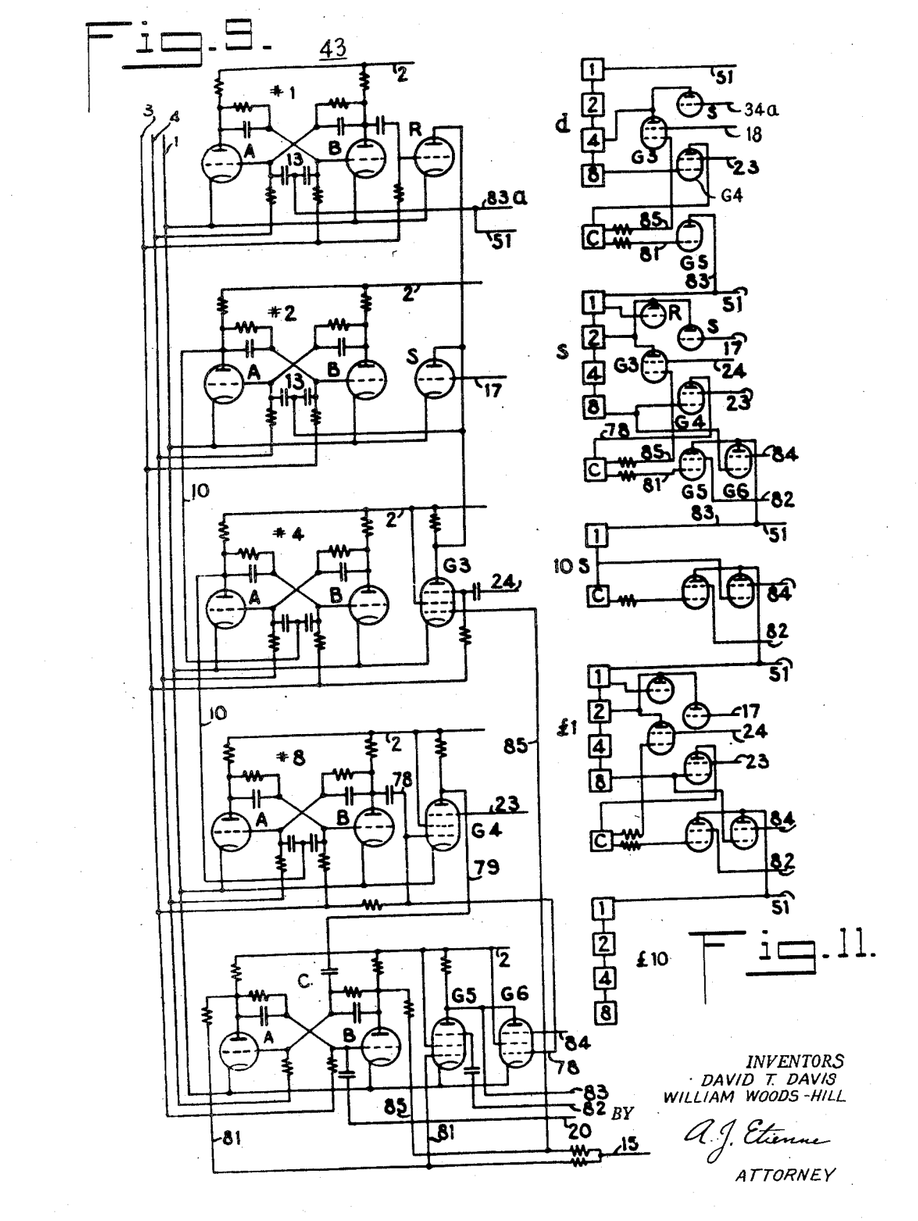
Figure 9 is a circuit diagram of one denomination of the product counter indicated as 43 in Figure 1.
Figure 11 is a diagrammatic representation of the complete multidenominational product counter.

This counter is indicated generally as 43 in Figure 1 and shown in detail in Figures 9 and 11.

Each denomination of the counter consists of four trigger stages, representing the values 1, 2, 4, 8. Entry is effected by applying the appropriate number of pulses to the line 51. There are four product transfer tubes 44 for each denomination (Figure 1). They are jointly controlled by the triggers of the multiplicand register 42 and the odd-even detector unit F2 and Q, in the manner already described. In addition, the screen grid of each transfer tube #1 is connected to the line 50(1), and similarly the groups of transfer tubes #2, #4, and #8 are connected to the lines 50(2), 50(4) and 50(8). These lines are connected directly to the anodes of the appropriate amplifying tubes 46. Each tube 46 is normally at zero bias and so conducting heavily, thus producing a large potential drop across the anode load resistor. When a negative pulse is applied to the grid of a tube 46 from the emitter via line 34b, the tube is cut off and the anode potential rises. If the control grid and suppressor grid of a pentode 44 have been brought near cathode potential, then the positive pulse on the screen grid transmitted to it by line 50 will produce a negative pulse at the anode, which single pulse will be applied to a trigger #1 of the product counter via line 51. Eight pulses are provided by a tube 46 on line 50(8), so that if any of the pentodes 44(8) have been prepared for operation by the multiplicand register and the odd-even detector, eight pulses will be transmitted via line 51 to enter eight in the related denomination of the product counter. The values 1, 2, and 4 are similarly entered.

The setting of trigger #2 by trigger #1 is effected through tube R (Figure 9). The connection of triggers #2 to #4 and #4 to #8 is via the lines 10, as in the multiplicand register.

It is necessary to enter 6 and 10 into the product counter for correction in the decimal denominations as in the multiplicand register. The value 6 is entered by applying three pulses to line 17 to flip the #2 trigger 3 times. The value 10 is entered by applying five pulses on line 24, the gate G3 being controlled by the setting or non-setting of the trigger carry stage C in the same way as gate G2 in the multiplicand register. In similar manner, 4 and 12 are entered in the pence duo-decimal denomination. A single pulse is applied to line 34a and transmitted to trigger #4 by tube S, to enter 4. Three pulses are transmitted to gate G3 via line 18 which also is connected to trigger #4 to cause the entry of 12 (see pence order Fig. 11).

When trigger #8 is switched over from the "on" state to normal, a positive pulse is applied to the control grid of G4, producing a negative pulse at the anode, which is transmitted via line 79 to the grid of tube A of carry trigger stage C to set it. With tube A of trigger C non-conducting, the control grid of gate G5 is brought to approximately the potential of line 1. At a later stage, a positive pulse is applied to the suppressor grid of gate G5 via line 82 and if the carry trigger stage C is set, a negative pulse will be produced at the anode of gate G5 and transmitted by line 83 to trigger #1 of the next higher denomination. This is indicated by the connection 83a to trigger #1 of Figure 9.

All the gates G5 receive a pulse on line 82 at the same time, so that all the carries are entered at the same time. If any of the denominations are standing at 9 (decimal) or 11 (duo-decimal), then the addition of the carry will generate a further carry. This possible further carry is dealt with by the gates G6. Before a pulse has been applied to line 82, the potential of line 84 is raised and continues raised for a while after line 82 has been pulsed (see Voltage To Open Gates G6, Fig. 13). If trigger #8 now switches from the "on" state to normal, a positive pulse is transmitted directly to the control grid of gate G6 via line 78. The resulting negative pulse at the anode is transmitted via line 83 to the trigger #1 of the next higher denomination.

The connection of the various denominations of the products counter is shown in schematic form in Figure 11. The pence denomination is connected for duo-decimal operation, the shillings for decimal, the tens of shillings for counting to two, and the pounds and tens of pounds for decimal operation.

*Operation of complete multiplying device*

In order to show the functioning of the multiplying device as a whole, one complete multiplying cycle, comprising two complete emitter cycles, will now be described.

A gate will be described as being "operative" when the electrode potentials are such that, on applying an operating pulse, a pulse is produced at the output electrode, which is normally the anode. The expression "partially operative" will be applied to a gate in which control potentials are applied to more than one electrode and in which not all of the electrode potentials are such as to make the gate operative. An example of this condition is a product transfer tube 44 in which the suppressor grid is at approximately cathode potential but the control grid is more negative than the cut-off value. A gate will be described as "inoperative" when an operating pulse produces no pulse at the output electrode, and all control electrodes are more negative than cut off potential.

The multiplying operation will be sub-divided into a sequence of steps, each step representing one operation of one of the emitter units 30.

By way of illustration, it will be assumed that the multiplier (MP) equal to –99– and multiplicand (MC) equal to £9 18s. 2d. of the numerical example previously given, have been entered into the appropriate registers.

Reference may be had particularly to Figures 1 and 1a showing the interconnection of the various units already described in detail and to Figure 13, which briefly describes the function and illustrates the relative time relationship of the various control voltages and operating pulses.

On depression of the start key 90 (Figure 4), the trigger stages UV and XY are switched over to produce a negative pulse on line 87 and to make gate Z operative. The half cycle control unit 100 is in a state such that gates 134 (Fig. 2) of the emitter units 30 are operative.

STEP 1

Emitter unit 30(1) is switched "on" by the pulse on line 87. The resulting pulse on line 34b is amplified and inverted in polarity by amplifier 46 (Fig. 1a) and applied (see Pulse To Odd Even Detector To Set It. Set For Odd, Fig. 13) via line 77 to odd-even detect tube F2 (see also Fig. 7). Since an odd number (99) is standing in the multiplier register, trigger #1 of the units denomination is "on," rendering tube F2 operative. Thus the pulse on line 77 will via tube F2 cause trigger Q to switch "on," raising the potential of line 47 and making all the transfer tubes 44 partially operative.

The same pulse from emitter unit 30(1) via line 34b will switch the trigger stage of the connected auxiliary control unit 55 "on," raising the potential of line 23, to make operative the gates G1 in the carry circuits of the multiplicand register and gates G4 in the carry circuits of the product counter (see Voltage To Open Gates G1 And G4, Fig. 13).

The multiplicand register contains the value £9 18s. 2d. so that via the lines 48, the following transfer tubes 44 will be made fully operative:

Connected to the pence denomination-pentode 44(2);

Connected to the shillings denomination-pentode 44(3);

Connected to the tens of shillings denomination-pentode 44(1);

Connected to the units of pounds denomination-pentodes 44(1) and 44(8);

Connected to the tens of pounds denomination—none.

Finally a pulse on line 32 from the pulse generator 31 switches emitter unit 30(1) back to normal, producing a negative pulse on line 131.

STEP 2

Emitter unit 30(2) is switched "on" by this pulse on line 131. The negative emitter pusle is amplified and inverted by tube 46 connected to line 34b from 30(2) and transmitted via line 50(8) to the screen grids of the transfer tubes 44(8). The pentodes 44(8) are operative only in the units of shillings and units of pounds denominations, so that one pulse will be fed to these product counter denominations, effecting an entry of one (see Pulses For Transferring Into Product Counter, Fig. 13).

A pulse on line 33 from the pulse generator 31 will switch emitter unit 30(2) back to normal, producing a negative pulse on line 131.

STEP 3

Emitter unit 30(3) will be switched "on" by the pulse on line 131 from unit 30(2). The resulting negative pulse passes through the same amplifier 46 and via line 50(8) adds another one into the same denominations.

STEP 4 TO STEP 9 INCLUSIVE

By the successive switching of emitter units 30(4) to 30(9), a further six pulses are sent via line 50(8) to add a total of eight in the product counter. Thus the units of shillings and units of pounds denominations each register a value of –8–.

STEP 10

Emitter unit 30(10) is switched "on" by unit 30(9) and a pulse is transmitted via its connected line 34b, a second amplifier 46 and line 50(4) to the screen grids of all the transfer tubes 44(4). Since none of these valves is fully operative, no pulse will be produced on lines 51.

STEP 11 TO STEP 13 INCLUSIVE

Three further pulses are transmitted along line 50(4) by the switching of the emitter units 30(11) to 30(13) inclusive, but are not effective to make an entry in the product counter.

STEP 14

A pulse from emitter unit 30(14) is transmitted via its line 34b, an amplifier 46 and line 50(2) to the transfer tubes 44(2). The tube 44(2) in the pence denomination is operative, so that an entry of "one" is made.

STEP 15

A second pulse is transmitted to the transfer tubes 44(2) from emitter unit 30(15) to enter a further one into the pence denomination of the product counter. The value now registered is £8 8s. 2d.

STEP 16

A pulse from emitter unit 30(16) is transmitted via its line 34b, an amplifier 46 and line 50(1) to the transfer tubes 44(1). The tubes 44(1) in the tens of shillings and units of pounds denominations are operative, so that entries of one are effected in these denominations. Accordingly, the value registered in the product counter will now be £9 18s. 2d., that is, the transfer of the value from the multiplicand register to the product counter has been completed once.

STEP 17 AND STEP 18

The emitter units 30(17) and 30(18) switch "on" and back to normal, but since they have no gates 134 their pulses are not utilized on this half cycle to control any machine operations.

STEP 19

The negative pulse from emitter unit 30(19) is transmitted via line 117 to the cycle counter 49 (see Pulse To Start Unit 39 And Cycle Counter 49, Fig. 13) to effect an entry of one. When the emitter unit 30(19) is switched off by the negative pulse on line 32, a negative pulse is transmitted via line 131 to switch over the half cycle control unit 100, so that the gates 133 (Fig. 2) are now made operative (see Voltage From 100 To Open Gates 133, Fig. 13) and the gates 134 rendered inoperative. A positive pulse is also transmitted via line 38 to the grid of gate Z (Figure 4) in the start control unit. The negative pulse thus produced at the anode of gate Z via line 89 switches emitter unit 30(1) "on" and so commences the second half of the multiplier cycle.

STEP 20

The negative pulse on line 34 from emitter unit 30(1) serves via line 65 (Figs. 1 and 7) to reset the odd-even detector trigger state Q, and also resets "off" the trigger stage N which controls the dual triodes E2, E4 and E3 in the multiplier register (see Pulse To Trigger Q and Trigger N, Fig. 13) the line 34 being directly connected to line 65 of Figure 7. When trigger Q is thus reset, the suppressor grids of all the transfer pentodes 44 (Fig. 1) are made more negative preventing any further transfer from the multiplicand register to the product counter. With triode A of trigger N conducting, the right hand tubes of dual triodes E are operative for halving the multiplier.

STEP 21

The negative pulse from emitter unit 30(2) is applied via line 34 to the triggers #8 of the multiplicand register, (see Pulse To Multiplier #1 And Multiplicand #8, Fig. 13) this line being connected to the lines 12(8) (Figure 8) in each denomination. The trigger #8 is set in the units of shillings and units of pounds denominations, so that the pulse will switch these trigger stages to normal, and thus the carry trigger stages C will be set, G1 having been made operative at step 1.

The line 34 of emitter unit 30(2) also connects to the line 12(1) in the two denominations of the multiplier register. Both triggers #1 are "on" and will be switched "off" by the pulse. Since the left hand tubes of dual triodes are not operative, the units denomination trigger stage will not affect any of the other stages. The tens denomination trigger #1 will send a pulse via line 72 as described above for all orders above the units order to switch the carry trigger stage P "on" for subsequent 5's carry to the units order.

STEP 22

The pulse from emitter unit 30(3) via lines 34 and 12(4) will be enabled to reset the triggers #4 in the multiplicand register and via lines 34 and 12(2) will be enabled to reset the triggers #2 in the multiplier register. Since in this example none of these triggers is "on," no change will be made.

STEP 23

The pulse from emitter unit 30(4) will effect resetting of the triggers #2 in the multiplicand register and triggers #4 in the multiplier register. In the multiplicand register, pence denomination trigger #2 being switched to normal, will switch trigger #4 to the "on" state.

STEP 24

The emitter pulse from emitter unit 30(5) will effect resetting of triggers #1 in the multiplicand register and triggers #8 in the multiplier register. As a result, in the multiplicand register, a carry will be registered in the tens of shillings denomination and value 2 in the units of pounds denomination. In the multiplier register, by the halving process value 4 will be registered in both units and tens denominations.

The halving and doubling operation has now been completed, apart from the addition of carries. The registers now contain the following values:

Multiplicand:

Pence____________ 4 (Step 23).
    Units of shillings__ 0 and carry (Step 21).
    Tens of shillings___ 0 and carry (Step 24).
    Units of pounds____ 2 and carry (Step 24 and Step 21).
    Tens of pounds____ 0.

Multiplier:

Units___________ 4 (Step 24).
    Tens____________ 4 and carry (Step 24 and Step 21).

STEP 25

The pulse from emitter unit 30(6) is transmitted via line 34a to trigger #4 of the pence denomination (see Pulses To Pence Triggers #4, Fig. 13) of the multiplicand register and via line 34a (Figure 9) and tube S to the trigger #4 of the pence denomination of the product counter, thus effecting the corrective entry of four in these two pence denominations. At the same time, the pulse via line 34 and the connected auxiliary control unit 54 via lines 17 effects the corrective entry of two in the shillings and pounds sections of the product counter and via lines 17 and dual triodes D (Fig. 8) to effect the corrective entry of 2 in the denominations of the MC counter.

STEP 26 and STEP 27

The pulses from emitter units 30(7) and 30(8) effect two further entries of two in all the decimal denominations of the MC and of the product counter so that a total correction of six has now been entered.

The values standing in the registers at this time are:

Multiplicand:

Pence____________ 8.
    Units of shillings__ 6 and carry.
    Tens of shillings___ 0 and carry.
    Units of pounds____ 8 and carry.
    Tens of pounds____ 6.

Multiplier

Units___________ 4.
    Tens____________ 4 and carry.

STEP 28

The negative pulse from emitter unit 30(9) is transmitted via line 66 (see Pulses To Multiplier Register To Carry Up Line 66, Fig. 13) to switch on trigger stage N of the multiplier register, thus making the left hand triodes of dual triodes E operative. The pulse also sets auxiliary control unit 55 connected to 30(9) and line 84 is raised in potential to make gates G6 of the product counter operative for carry on carry (see Voltage To Open Gates G6, Fig. 13).

STEP 29

The pulse on line 34 from unit 30(10) is inverted by the amplifier 46 and transmitted via line 82 (see Carry Pulse To Product Counter Line 82, Fig. 13) to the suppressor grids of gates G5 (Figure 9) of the product counter. If any of the carry trigger stages C have been set, then the related gate G5 will be operative and a carry pulse will be transmitted to trigger #1 of the next higher denomination. Gates G6 for carry on carry are also operative (Step 28) to deal with any successive carries that may occur.

The auxiliary control unit 55 which is also connected to 30(1) is now switched over to lower the potential of line 23 to block carry tubes G1 and render gates G4 inoperative (see Pulse To Unit 55 To Close G1 And G4, Fig. 13).

STEP 30

There is no outlet for a pulse from unit 30(11) on this half cycle.

STEP 31

The pulse from emitter unit 30(12) resets the auxiliary control unit 55 connected to 30(9) to make inoperative the carry on carry gates G6 in the product counter.

STEP 32

The pulse from emitter unit 30(13) via auxiliary control unit 58 and pentode F1 (Fig. 7) if this has been made operative by carry trigger P being "on," enters a carry down value of one out of five into the units denomination of the multiplier register. At the same time, via line 24 and gates G2 and G3 in the decimal denominations of the multiplicand register and product counter, the corrective value 2 out of 10 is entered provided carry has not been set (see Pulses To Add 10 In Registers And Counter Decimal, Fig. 13).

STEP 33

A further entry of a carry down value of one is made in the multiplier register under control of 30(14). A further corrective value of two is also made into the multiplicand register and product counter provided of course carry has not been set.

STEP 34

As for Step 33 but under control of 30(15) and in addition a pulse via auxiliary control unit 54, line 18 and gates G2 and G3 enters a corrective four out of 12 into the duo-decimal denominations (see Pulses To Add 12 Duo-Decimal, Fig. 13) of the multiplicand register and product counter.

STEP 35 AND STEP 36

As for Step 34 but under control of 30(16) and 30(17) respectively. Thus after Step 36, a carry down of five has been entered in the units denomination of the multiplier register, a corrective ten, if required, in the decimal denominations and a corrective twelve, if required, in the duo-decimal denominations of multiplicand and product. However, as has already been described, these entries are actually effective only in those denominations of the multiplicand and product in which no carry has been registered. Accordingly the values now registered are:

Multiplicand:
Pence _____________________ 4 (8+12).
Units of shillings ___________ 6 and carry.
Tens of shillings ____________ 0 and carry.
Units of pounds ____________ 8 and carry.
Tens of pounds ____________ 0 (6+10).

Multiplier:
Units _____________________ 9 (4+5).
Tens ______________________ 4

It will be noted that no carries occur during the addition of 10 or 12, since the carry gate valves are inoperative.

STEP 37

The pulse from emitter unit 30(18) via line 34 and line 20 effects resetting of the carry trigger stages C of the register 42 to produce carries of carry trigger stage C of counter 43 and of the carry trigger stage P of register 41 to reset them ready for carry (see Pulse To Reset Triggers C In 42 and 43 And Trigger P in 41, Fig. 13).

Thus the final values are:

Multiplicand:
Pence _____________________________ 4
Units of shillings __________________ 6
Tens of shillings __________________ 1
Units of pounds ___________________ 9
Tens of pounds ___________________ 1

Multiplier:
Units ______________________________ 9
Tens ______________________________ 4

Product:
Pence _____________________________ 2
Units of shillings __________________ 8
Tens of shillings __________________ 1
Units of pounds ___________________ 9
Tens of pounds ___________________ 0

It may be noted that it is possible to effect carries in the multiplicand register by resetting the carry triggers C at this time, since the values registered must be even, owing to the doubling, and therefore the addition of a carry in any denomination cannot cause a further carry.

Seven further complete multiplying cycles are carried out before the cycle counter 40 prevents further cycling, and the product of £980 18s. 6d. will then be standing in the product counter. It will be understood that in order to accommodate the full product, a further denomination for the hundreds of pounds will be required (not shown in Figure 1a) similarly connected to that for the tens of pounds.

It has been found that the following types of valves and values of components provide satisfactory operation:

The cathode follower tubes J, K and M are type 6J5.

The amplifier tubes 46 are type 6V6.

All other triodes are type 6SN7.

All other pentodes are type EF50.

All resistors such as 128 from the anode of a tube to line 2 are 22,000 ohms.

All resistors such as 108 from the control grid of a tube to line 1 are 50,000 ohms.

All cross coupling resistors such as 126 in trigger stages are 100,000 ohms.

All voltage divider resistors such as 147 are 220,000 ohms.

All voltage divider resistors such as 146 are 440,000 ohms.

Resistor 141 is 220,000 ohms.

Resistors 139 and 161 are 50,000 ohms.

Resistors 91 are 100,000 ohms.

Resistor 162 is 22,000 ohms.

Resistor 163 is 50,000 ohms.

Resistors 143 are 220,000 ohms.

Resistor 96 is 20,000 ohms.

Resistors 96a, 96b, 96c and 97 are respectively 50,000 ohms, 20,000 ohms, 50,000 ohms and 50,000 ohms.

Condensers 110 and 111 are 600 micromicrofarad.

Condensers such as 125 and 124 in the grid couplings of trigger stages are 200 micromicrofarad.

Condensers such as 135 in the grid couplings of trigger stages are 25 micromicrofarad.

Condensers such as 122 and 123 in the grid input coupling of trigger stages are 50 micromicrofarad.

Condensers 164 and 165 are 50 micromicrofarad.

Condenser 166 is 50 micromicrofarad.

Condensers 167 and 168 are 50 micromicrofarad.

Condensers 170 are 10,000 micromicrofarad.

Condenser 171 is 32 microfarad.

In the circuit so far considered, fifteen pulses were provided for reading out into the #1 trigger stage of each denomination of the product counter. This involved the use of three controlling electrodes on the gates 44 between the multiplicand register 42 and the product register 43. Considerable simplification of this transfer is possible where the values to be entered in the product register may be entered by pulsing any one or more of the four trigger stages of a denomination of the product register. In this modification, the product transfer pentodes 44 for each denomination are jointly controlled by the odd-even detector F2 and Q as before, and each pentode 44 by the associated trigger stage of the multiplicand register as before, but the screen grids are all connected via a resistance to the main HT line. This therefore dispenses with the fifteen pulses previously required to be entered from the emitter and enables the emitter stages to be correspondingly reduced in quantity. The anodes therefore of these tubes 44 have separate anode loads instead of four in each denomination being connected in common. Each separate anode is connected via a condenser to a trigger stage in the product register having the same value as the trigger stage in the multiplicand register controlling on the grid of the transfer tube 44. Therefore, as previously described, the multiplicand trigger stages, if "on," are switched "off" in the order #8, #4, #2, #1, by the emitter steps 2, 3, 4, 5 in second half cycle. Those so switched will produce a positive pulse which is applied to the control grids of the transfer tubes. The suppressor grid, being controlled from the odd-even control will, if odd, allow a negative pulse at the anode of 44. Thus a #8 trigger stage of the multiplicand register may apply a pulse to switch the #8 trigger stage of the product counter in the same denomination in lieu of providing eight pulses for operating the #1 trigger stage in this denomination. The pulses to the multiplicand #8, #4, #2, and #1 trigger stages occur prior to the carry pulse to the product counter on line 82 (emitter step 10 of second half cycle). By reason of the values of the multiplicand being scanned in the order #8, #4, #2, #1, no difficulty occurs from the intermediate carries in the product register.

While there have been shown and described and pointed out the fundamental novel features of the invention as applied to preferred embodiments, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination, a source of pulses, a series of trigger circuits connected in cascade, a start unit, manually operated means to operate said start unit initially to thus operate the first one of said series of trigger circuits to a flipped status, means applying pulses from said source to said trigger circuits to return said manually flipped trigger circuit respectively from its flipped to its original status, means operative upon said return to flip the next trigger circuit, which in turn is reset by said pulses to flip the next succeeding trigger and thusly continuing through said series of trigger circuits, and means including an electron valve switch rendered operative by the operation of the last of said series to by-pass said manually operative means to again initiate operation of said series of trigger circuits.

2. In combination, a source of pulses, a series of trigger circuits connected in cascade, a start unit, manually operating means to operate said start unit initially to thus operate the first one of said series of trigger circuits to a flipped status, means applying pulses from said source to said trigger circuits to return said trigger circuits from said flipped to the original status, means operative upon said return to flip the next trigger circuit which in turn is reset by said pulses and thusly continuing through said series of trigger circuits, additional trigger circuit means rendered operative by the operation of the last trigger circuit in said series, a pair of gate tubes respectively for each trigger circuit of said series, and means controlled by said additional trigger circuit means to render one of said pair of gate tubes operative for each of said series of trigger circuits in one status of said additional trigger circuit and rendering the other of said pair of gate tubes operative for each of said series of trigger circuits in the other status of said trigger circuit.

3. A device as in claim 2 and additional means including a counter, said last trigger circuit stepping said counter each time it is operated and producing an output pulse to stop operation of said series when the capacity of said counter is exceeded.

4. In combination, a source of two series of timed pulses, a series of trigger circuits connected for operation in seriatim, means applying one of said series pulses from said source to alternate ones of the trigger circuits in said series, and means applying the other of said series to the remaining trigger circuits in said series, switch means for initially turning on the first trigger circuit of the series, one pulse of one series pulses resetting said first trigger circuit to turn on the trigger circuit of the series which in turn is turned off by one of the pulses of said other series and means controlled by the last trigger circuit of the series to by-pass said switch means and initiate further operation of said first trigger circuit.

References Cited in the file of this patent

UNITED STATES PATENTS

| Number | Name | Date |
|---|---|---|
| 2,384,379 | Ingram | Sept. 4, 1945 |
| 2,402,432 | Mumma | June 18, 1946 |
| 2,416,095 | Gulden | Feb. 18, 1947 |
| 2,524,123 | Dickinson | Oct. 3, 1950 |
| 2,547,511 | Weissman | Apr. 3, 1951 |